United States Patent [19]

Fox

[11] 4,130,258

[45] Dec. 19, 1978

[54] AIRCRAFT WITH RETRACTABLE AUXILIARY POWER UNIT

[76] Inventor: Anthony Fox, 8306 Queen Ave. South, Minneapolis, Minn. 55431

[21] Appl. No.: 852,216

[22] Filed: Nov. 17, 1977

[51] Int. Cl.² .............................................. B64D 41/00
[52] U.S. Cl. ...................................................... 244/58
[58] Field of Search ................... 244/58, 55, 74, 6, 54; 115/41 R, 35

[56] References Cited

U.S. PATENT DOCUMENTS

| | | | |
|---|---|---|---|
| 3,030,910 | 4/1962 | Alsager | 115/41 R |
| 3,069,116 | 12/1962 | Ward | 244/58 |
| 3,134,561 | 5/1964 | Clejan | 244/58 |
| 3,349,566 | 10/1967 | Tyrrell et al. | 244/58 X |
| 3,592,415 | 7/1971 | Walley et al. | 244/55 |
| 4,075,971 | 2/1978 | Reginensi | 115/41 R |

*Primary Examiner*—Barry L. Kelmachter
*Attorney, Agent, or Firm*—Orrin M. Haugen; Thomas J. Nikolai

[57] ABSTRACT

A powered aircraft having an auxiliary thruster engine normally disposed within the fuselage of the aircraft, but which, when activated, is moved to an operative position outside of the fuselage prior to its energization, the auxiliary thruster engine providing sufficient thrust to power the aircraft if one or more of its normal engines is inactive.

1 Claim, 6 Drawing Figures

AIRCRAFT WITH RETRACTABLE AUXILIARY POWER UNIT

BACKGROUND OF THE INVENTION

I. Field of the Invention

This invention relates generally to heavier than air aircraft and more specifically to the incorporation therein of an auxiliary power unit which, when inactive, is normally stowed within the confines of the airframe, but which is moved to a location which is exterior to the confines of the aircraft prior to activation thereof.

II. Description of the Prior Art

Many types of jet aircraft are known in the prior art. Such aircraft have been designed for commercial, business and pleasure use and generally comprise an airframe including a body or fuselage and having conventional wings, tail and elevators attached to the body. Also, such prior art arrangements generally have one or more jet engines disposed either directly on the fuselage or on the wings to provide the necessary thrust for powering the aircraft. While multi-jet aircraft are generally designed to operate when fewer than all of the engines are working, if power to all engines is lost, they become difficult to maneuver and land because of the aerodynamic design of the vehicle requires that landing take place with power applied. Accordingly, it is desirable that an auxiliary engine be provided which can be deployed in the event that the main power units become inoperative either because of a lack of fuel or because of malfunction. I am presently unaware of any prior art jet aircraft which incorporates such an auxiliary power unit.

SUMMARY OF THE INVENTION

In my U.S. Pat. No. 3,903,693 there is described the construction of a small hydrogen peroxide fueled rocket thruster engine and which can be made to generate up to 5,000 pounds of thrust or more. In accordance with the teachings of the present invention, I provide an arrangement wherein such a rocket thruster may normally be disposed within the body or fuselage of the aircraft, but which, when actuated by the pilot, is deployed outside of the fuselage and which when activated can provide sufficient power for maintaining normal flight for a period of time dependent upon the amount of hydrogen peroxide fuel carried by the aircraft. Thus, in the event one or more of the main power units becomes inoperative, the pilot may selectively deploy the auxiliary rocket thruster to ensure that power is available for maneuvering the aircraft and landing same.

More specifically, there is provided in the bottom of the aircraft an opening which is normally closed off from the ambient by means of hinged door segments which are shaped to conform to the profile of the aircraft fuselage in the area of the opening. Positioned above this opening and affixed to the framework of the fuselage are first and second guide rails between which is disposed an engine mounting plate, the disposition being such that the guide rails slidingly engage the vertical edges of the mounting plate. Affixed to this mounting plate is a rocket engine preferably of the type described in my U.S. Pat. No. 3,903,693 and a hydraulic piston/cylinder combination is connected between the mounting plate and the framework of the fuselage such that through selective activation of the hydraulic system, the pilot may lower the engine through the opening in the bottom of the fuselage prior to firing of the rocket engine. The same hydraulic cylinder arrangement may be used to retract the engine back into the fuselage after the rocket thruster has been de-energized.

It is accordingly a principal object of the present invention to provide a jet-type aircraft with an auxiliary power unit which may be deployed to either supplement or take over in case that one or more of the aircraft's main power units becomes inoperative.

A further object of my invention is to provide a means whereby an auxiliary power unit may be deployed from its normal position within the fuselage of an aircraft to an operating position external to the fuselage.

These and other objects and advantages of the invention will become more apparent to those skilled in the art from the following detailed description of the preferred embodiment when taken in conjunction with the accompanying drawings in which like numerals in the several views identify corresponding parts.

DESCRIPTION OF THE PREFERRED EMBODIMENT

Figure 1:
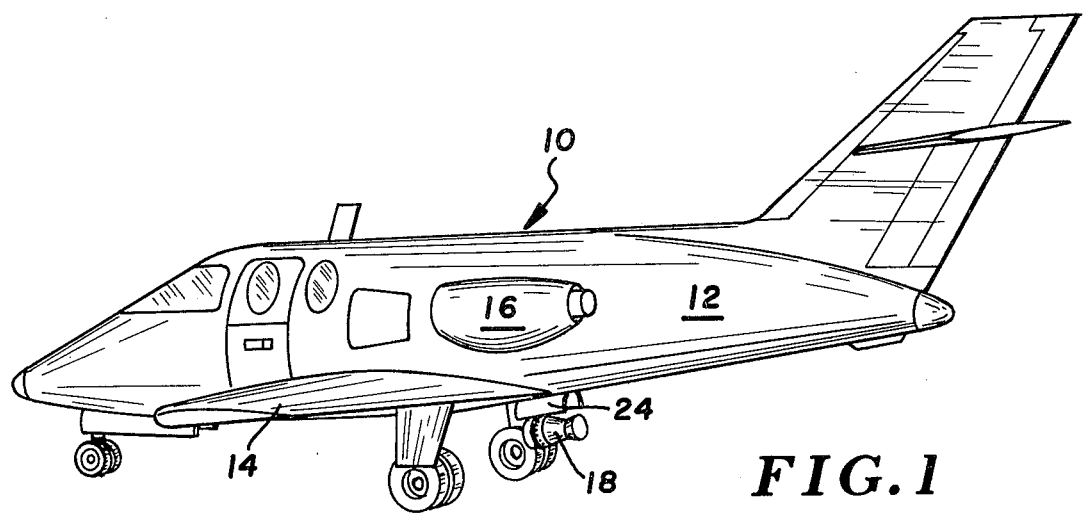
FIG. 1 is a perspective view of the aircraft in which the present invention finds use.

Referring now to FIG. 1, there is indicated generally by numeral 10 a jet powered aircraft having a fuselage 12 and wings 14 structurally supported from the fuselage and extending outwardly therefrom at a point generally midway along the longitudinal axis of the fuselage 12. Attached to the fuselage 12 and on either side thereof are first and second jet engines 16 which comprise the main power unit for the aircraft 10. In the preferred embodiment, the engines 16 may be Type WR19-3turbofans manufactured by the Williams Research Corporation of Walled Lake, Mich. which, when operative, each provide approximately 570 pounds of thrust. While the engines 16 are shown as being attached to the fuselage, limitation thereto is not intended since the present invention may find applicability to aircraft having wing mounted engines also.

In accordance with the teachings of the present invention, the aircraft 10 is also provided with an auxiliary power unit 18 which, when deployed in the manner illustrated in FIG. 1, is generally oriented approximately midway along the longitudinal axis of the aircraft and directly below this axis.

The auxiliary power unit 18 is preferably a rocket motor of the type described in my U.S. Pat. No. 3,903,693 and, as such, is preferably fueled with hydrogen peroxide fuel catalytically ignited and burned on screens of silver plated nickel. This provides a silver surface for combustion of the hydrogen peroxide entering the inlet chamber and coming into contact with the silver plated nickel screens. As is indicated in that Patent, the rocket engine thruster 18 may develop anywhere from 3,500 to 5,000 pounds of thrust, depending upon engine size, fuel pressure, hydrogen peroxide concentration, and the nozzle design.

Figure 2:
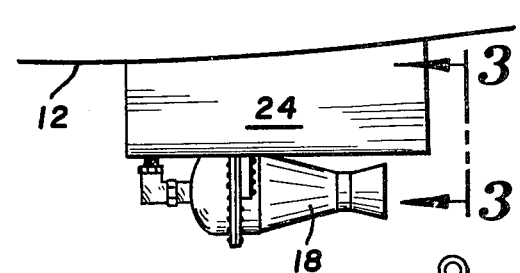
FIG. 2 is a side view of the portion of the aircraft of FIG. 1 wherein the auxiliary engine is deployed.
Figure 3:
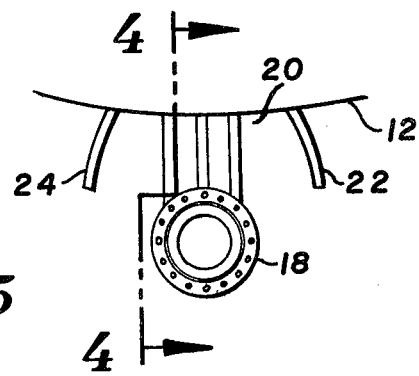
FIG. 3 is an end view taken along the lines 3—3 in FIG. 2.

With reference to FIGS. 2 and 3, it can be seen that there is provided in the bottom of the fuselage an opening 20 through which the rocket engine 18 may be deployed from a position wholly within the fuselage to its operating position located external to the fuselage 12. First and second pneumatically or hydraulically actuated doors 22 and 24 which are shaped or curved to conform to the bottom surface of the fuselage 12 are provided for normally covering the opening 20 when the engine 18 is disposed totally within the fuselage 12.

Figure 4:
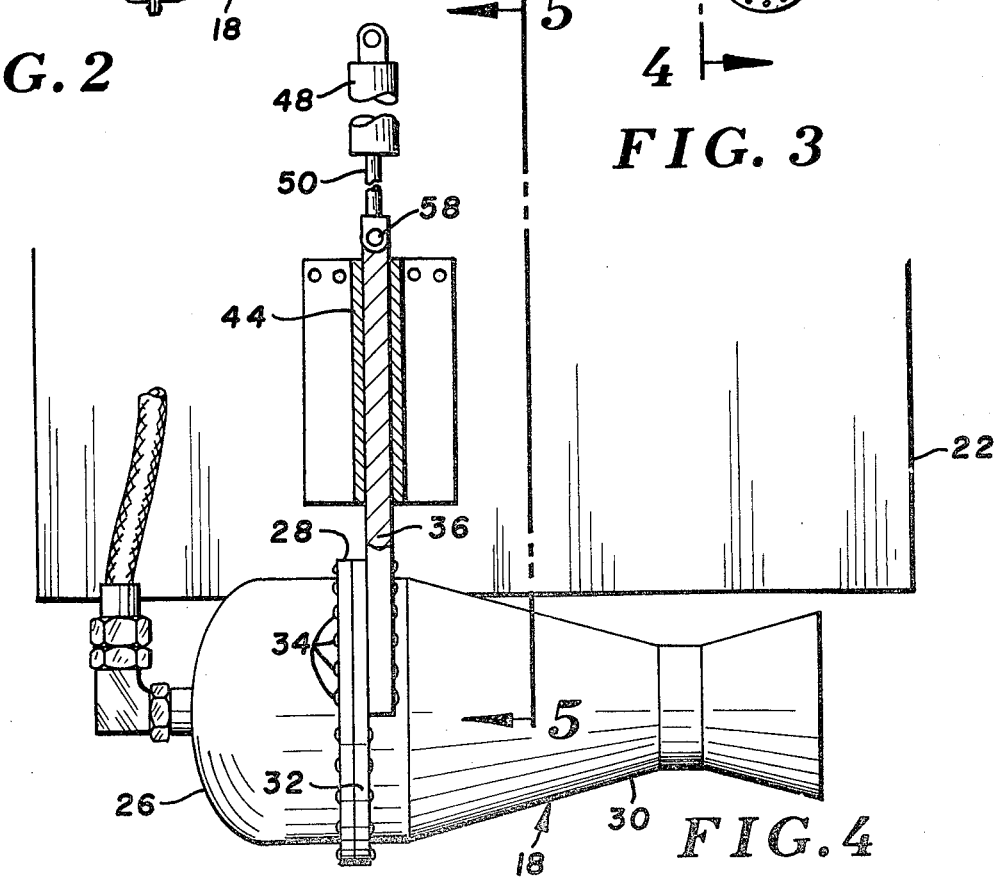
FIG. 4 is a partially cross-sectioned and enlarged view taken along the lines 4—4 in FIG. 3.

Next, with reference to FIGS. 4 through 7, the preferred arrangement for deploying and retracting the rocket engine 18 will be explained. As is illustrated in FIG. 4, the rocket engine includes a fuel intake chamber defined by a dome-shaped housing 26 which terminates in a outwardly extending circular flange 28 and a nozzle assembly 30 also provided with a outwardly extending circular flange 32. The flanges 28 and 32 are adapted to be joined, one to the other, by means of suitable fasteners such as bolts or rivets 34—34. A rigid steel mounting plate 36, which is generally rectangular in shape but which has a generally semicircular cutout 38 formed in the lower edge thereof so as to conform to the shape the engine 18 in the neighborhood of the flanges 28 and 32 is provided and the fastening members 34 are arranged to pass through holes drilled in the mounting plate 36 so as to tightly secure the engine assembly 18 to the plate 36.

Figure 6:
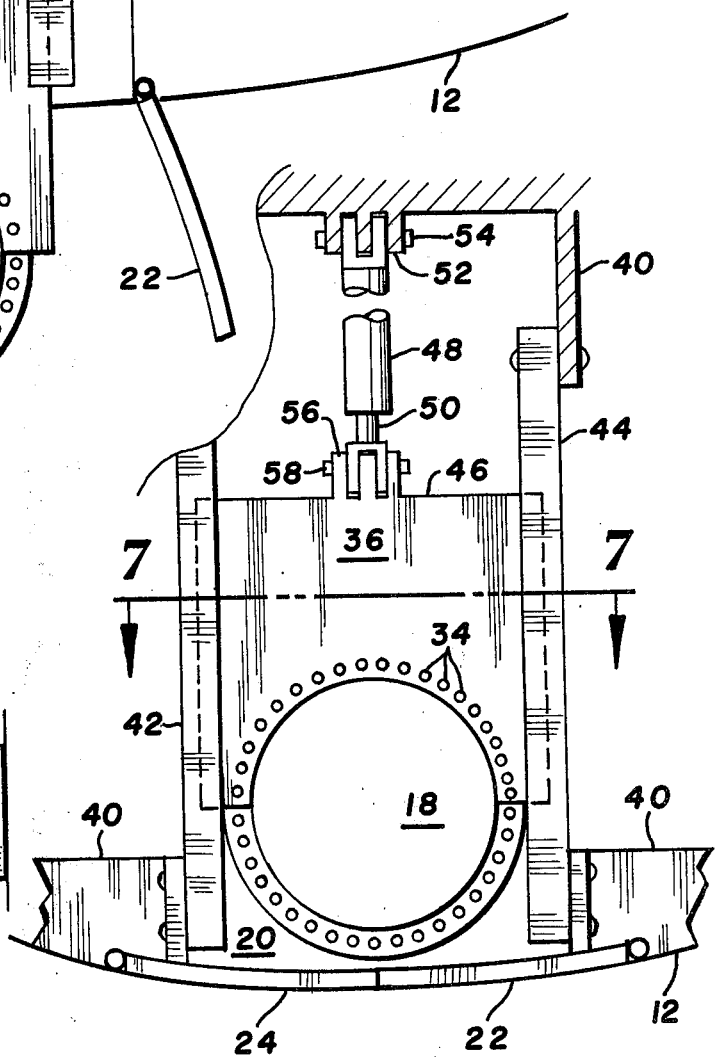
FIG. 6 is a cross-sectional view showing the auxiliary engine in its stowed position within the aircraft.
Figure 7:
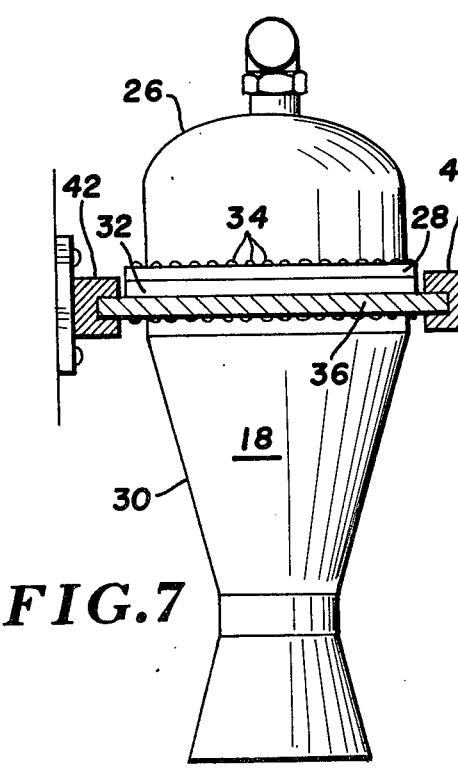
FIG. 7 is a cross-sectional view taken along the line 7—7 in FIG. 6.

With reference to FIGS. 6 and 7, there is shown attached to the structural frame members 40 of the fuselage 12, first and second guide rails 42 and 44 each having a channel formed therein to slidingly engage the vertical side edges of the mounting plate 36. A hydraulic cylinder 48 having a piston 50 operatively disposed therein is connected between a horizontally disposed structural frame member 40 of the airframe and the upper edge 46 of the engine mounting plate 36. More specifically, attached to the structural member 40 is a clevis 52 having a clevis pin 54 joining the cylinder 48 to the frame member 40. Similarly, a clevis assembly 56 is welded or otherwise attached to the upper edge 46 of the engine mounting plate 36 and a clevis pin 58 is used to complete the coupling to the end of the piston rod 50.

Figure 5:
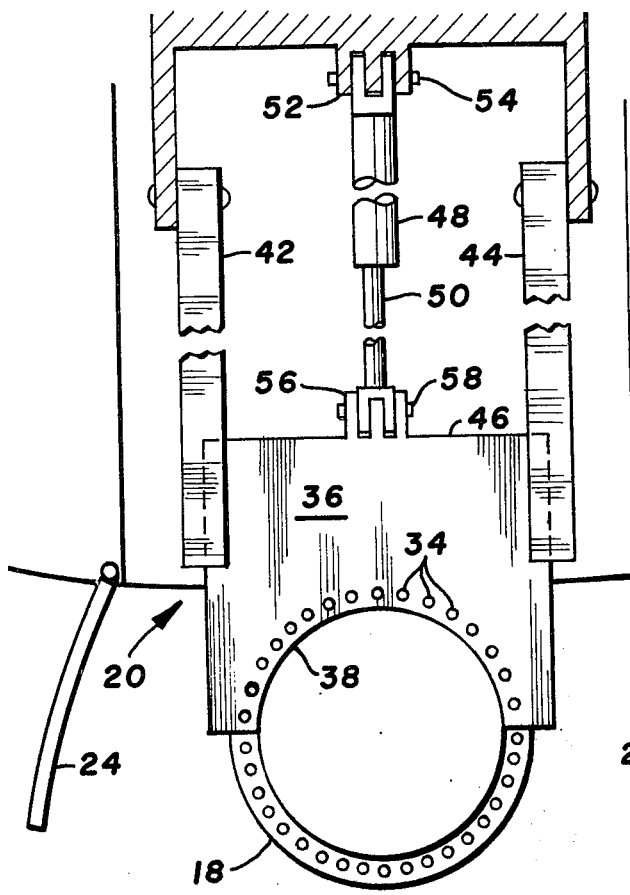
FIG. 5 is a cross-sectional end view taken along the lines 5—5 in FIG. 4.

FIG. 6 illustrates an end cross-sectional view of the rocket engine positioning assembly when the rocket engine is stowed within the fuselage 12 with the opening 20 covered by the door members 22 and 24. In this view, the piston 50 is substantially wholly contained within its cylinder 48 and the mounting plate 36 is in its elevated position with respect to the guide rails 42 and 44. In the case of an emergency, should the main power units 16 become inoperative, the pilot may deploy the auxiliary power unit 18 by activating a suitable hydraulic control (not shown) to cause the piston 50 to be extended from its cylinder 48. The hydraulic piston forces the mounting plate 36 to which the auxiliary power unit 18 is attached downwardly within the guide channels 42 and 44 such that the doors 22 and 24 are forced to their open position and the auxiliary power unit 18 is deployed outside of and below the confines of the fuselage 12. The rocket engine thruster 18 may then be energized to provide the necessary thrust to maintain the aircraft in operation. The view of FIG. 5 is a cross-sectional view showing the engine 18 in its deployed orientation.

Once the aircraft has been safely landed, the pilot may again actuate a hydraulic system such that the piston 50 is again withdrawn into its cylinder 48, thereby elevating the auxiliary power unit upward into its stowed position within the confines of the fuselage 12.

While the preferred embodiment of the invention has been described fully in order to explain the principals of the invention, it is to be understood that modifications in structure may be made by the exercise of skill in the art within the scope of the invention, which is not to be regarded as limited by the detailed description of the preferred embodiment.

What is claimed:

1. In a heavier than air aircraft of the type having an airframe including a fuselage supporting first and second wing members along the longitudinal axis of said fuselage and having first and second main power units disposed on opposite sides of said fuselage and generally above the longitudinal axis of said wing members, the improvement comprising:
    (a) an opening formed in the bottom of said fuselage said opening being located symmetrically about a line parallel to said longitudinal axis of said fuselage;
    (b) first and second door members shaped to conform to the surface of said fuselage in the area of said opening for normally covering said opening;
    (c) a hydrogen peroxide fueled thruster rocket engine auxiliary power unit;
    (d) a generally rectangular mounting plate connected to said auxiliary power unit;
    (e) first and second guide rails connected to said fuselage and extending transverse to said longitudinal axis of said fuselage and generally disposed within said fuselage and in proximity to said opening, said guide rails slidably engaging the edges of said mounting plate; and
    (f) hydraulically operable positioning means coupled between said fuselage and said mounting plate for selectively opening said door members and moving said auxiliary power unit from a normal position within said fuselage through said opening, to a position exterior to said fuselage and below the longitudinal axis of said first and second wing members prior to energization of said auxiliary power unit.

* * * * *